(12) United States Patent
Thiyagarajah et al.

(10) Patent No.: US 9,898,307 B2
(45) Date of Patent: Feb. 20, 2018

(54) STARTING APPLICATION PROCESSORS OF A VIRTUAL MACHINE

(71) Applicant: Intel Corporation, Santa Clara, CA (US)

(72) Inventors: Arumugam Thiyagarajah, Folsom, CA (US); Gaurav Khanna, Hillsboro, OR (US); Stalinselvaraj Jeyasingh, Portland, OR (US); Sohil Mehta, Hillsboro, OR (US); Mukesh J. Jagasia, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 87 days.

(21) Appl. No.: 14/976,990

(22) Filed: Dec. 21, 2015

(65) Prior Publication Data

US 2017/0177377 A1   Jun. 22, 2017

(51) Int. Cl.
*G06F 9/00* (2006.01)
*G06F 9/24* (2006.01)
*G06F 15/177* (2006.01)
*G06F 9/44* (2018.01)

(52) U.S. Cl.
CPC .......... *G06F 9/4406* (2013.01); *G06F 9/4403* (2013.01)

(58) Field of Classification Search
CPC .................................................. G06F 9/4406
See application file for complete search history.

(56) References Cited

U.S. PATENT DOCUMENTS

| | | | | |
|---|---|---|---|---|
| 5,193,161 A | * | 3/1993 | Bealkowski | G06F 12/0292 711/206 |
| 5,255,379 A | | 10/1993 | Melo | |
| 5,694,606 A | | 12/1997 | Pletcher et al. | |
| 5,710,941 A | * | 1/1998 | Parry | G06F 3/0619 710/14 |
| 5,758,124 A | * | 5/1998 | Ogata | G06F 9/45537 703/27 |
| 5,764,956 A | * | 6/1998 | Akahori | G06F 9/45504 703/24 |
| 5,937,185 A | * | 8/1999 | Weir | G06F 13/105 703/24 |
| 6,785,886 B1 | * | 8/2004 | Lim | G06F 9/45533 711/202 |

(Continued)

OTHER PUBLICATIONS lintemational Search Report and Written Opinion dated Feb. 28, 2017 for International Application No. PCT/US2016/016846, 10 pages.

*Primary Examiner* — Mohammed Rehman
(74) *Attorney, Agent, or Firm* — Schwabe, Williamson & Wyatt, P.C.

(57) ABSTRACT

Apparatuses, methods and storage medium associated with virtual machine application processor startup, are disclosed herein. In embodiments, an apparatus for computing may include a plurality of processor cores; and a plurality of OS modules of an OS. The OS modules may include a BSP module and an AP module. The BSP module may be configured to write into a storage area a start state of an AP of a VM, while the VM is being started up; and the AP module may be configured to start the AP at the start state, directly in a protected mode of execution without first going through a real mode of execution. Other embodiments may be described and/or claimed.

24 Claims, 5 Drawing Sheets

(56) References Cited

U.S. PATENT DOCUMENTS

| | | | | |
|---|---|---|---|---|
| 7,673,126 B2* | 3/2010 | Zimmer | ................ | G06F 9/4403 |
| | | | | 703/27 |
| 8,321,658 B2* | 11/2012 | El Zur | ................ | G06F 9/4416 |
| | | | | 709/222 |
| 2004/0210764 A1 | 10/2004 | McGrath et al. | | |
| 2006/0004982 A1* | 1/2006 | Matheny | ............... | G06F 9/5016 |
| | | | | 711/202 |
| 2006/0005200 A1 | 1/2006 | Vega et al. | | |
| 2008/0320295 A1* | 12/2008 | Chong | ................ | G06F 9/4401 |
| | | | | 713/2 |
| 2010/0169584 A1* | 7/2010 | Tong | ................ | G06F 9/45533 |
| | | | | 711/152 |
| 2012/0254667 A1* | 10/2012 | Zhang | ................ | G06F 11/0778 |
| | | | | 714/38.11 |
| 2014/0149992 A1 | 5/2014 | Zimmer et al. | | |

* cited by examiner

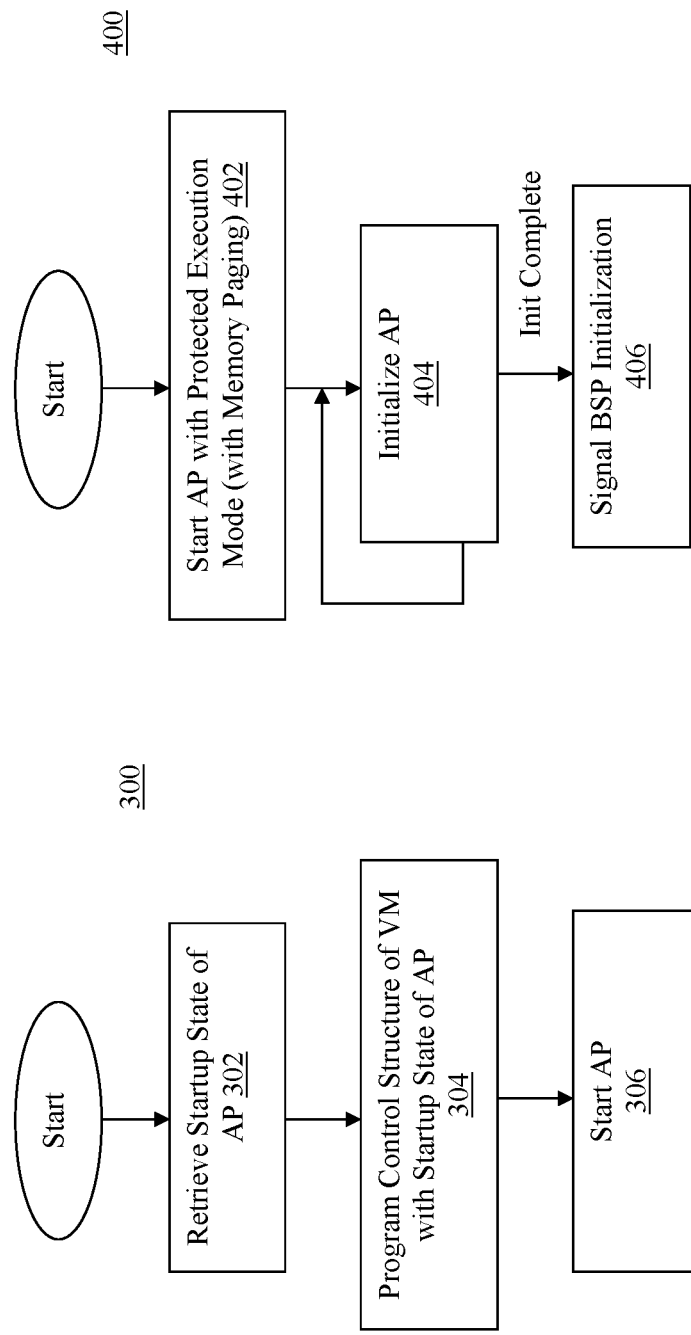

STARTING APPLICATION PROCESSORS OF A VIRTUAL MACHINE

TECHNICAL FIELD

The present disclosure relates to the field of computing. More particularly, the present disclosure relates to the starting of application processors of a virtual machine.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Typically, during the startup of a virtual machine (VM), the guest operating system (OS) of the VM first boots the virtual Boot Strapping Processor (BSP) of the VM, which in turn, sequentially boots all virtual Application Processors (AP) of the VM in a specified order. For Intel x86 execution environment, the virtual BSP (hereinafter, simply BSP) sends an INIT-SIPI-SIPI IPI sequence to start the virtual AP (hereinafter, simply AP). Each woken AP will begin execution in x86 real mode, and later switches into a protected mode, e.g., a 32-bit protected mode. Accordingly, the virtual machine monitor (VMM) (also referred to as hypervisor) is required to support real mode execution during AP startup, which increases the complexity of the VMM. (INIT=Initialization, IPI=Inter-Processor Interrupt, SIPI=Startup IPI.)

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 3 illustrates an example process of the VMM, according to the various embodiments.

FIG. 4 illustrates an example process of the AP startup module, according to various embodiments.

DETAILED DESCRIPTION

Figure 1:
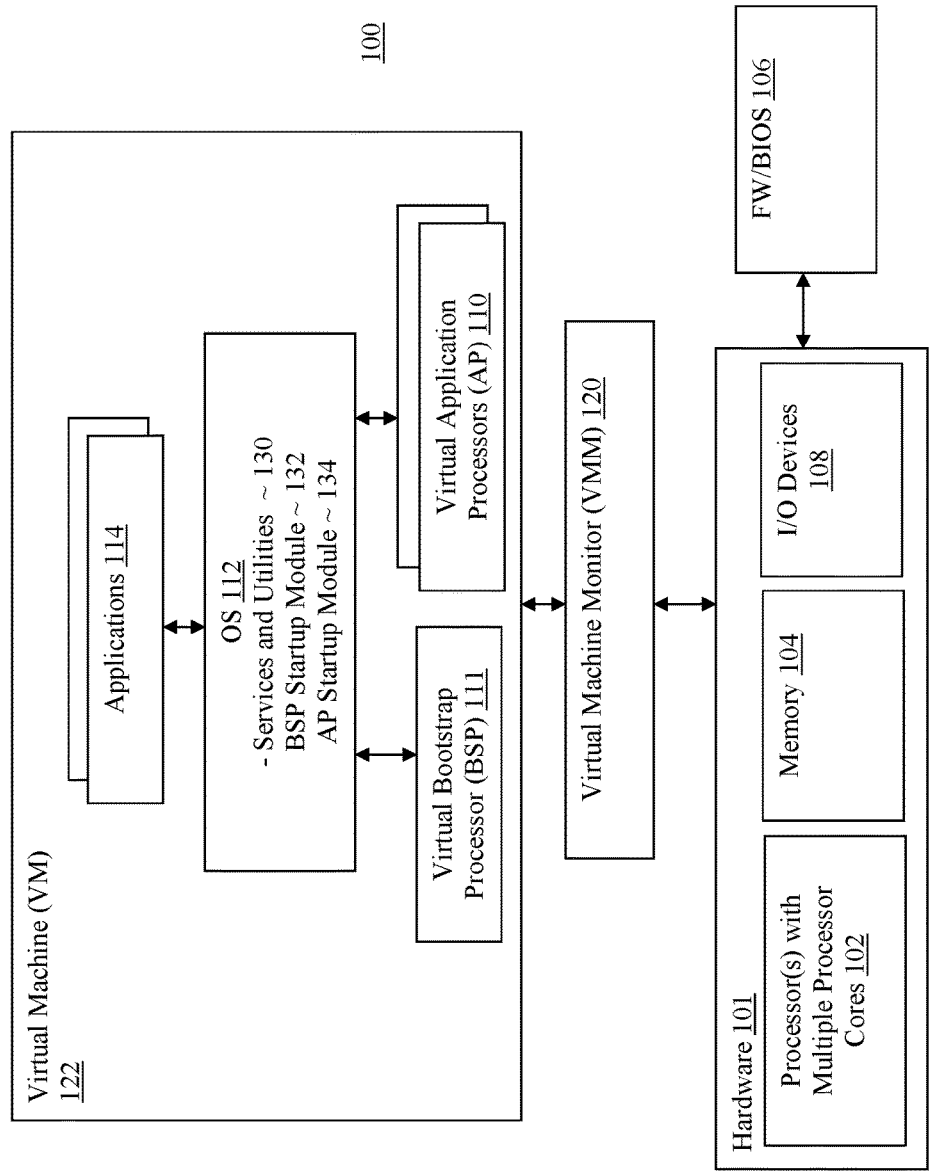
FIG. 1 illustrates a computing device having the virtual machine application processor startup technology of the present disclosure, according to various embodiments.

Apparatuses, methods and storage medium associated with virtual machine application processor startup, are disclosed herein. In embodiments, an apparatus for computing may include a plurality of processor cores; and a plurality of operating system modules of an operating system. The operating system modules may include a BSP startup module to be operated by a first of the plurality of processor cores selected to be a BSP of a VM while the VM is being started up, to write into a storage area a start state of an AP of the VM; and an AP startup module to be operated by a second of the plurality of processor cores selected to be the AP, to start the AP at the start state, directly in a protected mode of execution without first going through a real mode of execution.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein a computing device having the virtual machine application processor startup technology of the present disclosure, according to various embodiments, is shown. As illustrated, in embodiments, computing device 100 may include hardware 101, firmware (FW)/basic input/output services (BIOS) 106, VMM 120 and one or more VMs 122, operatively coupled with each other as shown. Hardware 101 may include one or more processors 102 with multiple processor cores. VM 122 may include a virtual BSP 111 mapped to a selected one of the processors cores of processor 102, and a number of virtual APs 110 mapped to selected corresponding ones of the processor cores of processor 102. VM 122 may further include OS 112 and a number of applications 114. OS 112 may include a number of services and/or utilities 130, which may include a BSP startup module 132 and an AP startup module 134. Applications 114 may be any application known in the art. As will be described in more detail below, BSP startup module 132, AP startup module 134 and VMM 130 may be incorporated with the virtual machine AP startup technology of the present disclosure to directly start APs 110 in a protected mode of execution without first going through a real mode of execution. These and other aspects related to application execution enclave management will be further described below with references to FIGS. 2-4.

Processor(s) 102 may be any one of a number of processors known in the art, having one or more processor cores. In embodiments, hardware 101 may further include memory 104, I/O devices 108, or other elements (not shown). Memory 104 may be any known volatile or non-volatile memory in the art, suitable for storing data. Memory 104 may include a hierarchy of cache memory and system memory. Both the cache and system memory may be respectively organized into cache pages and memory pages. Examples of I/O devices 108 may include communication or networking interfaces, such as Ethernet, WiFi, 3G/4G, Bluetooth®, Near Field Communication, Universal Serial Bus (USB) and so forth, storage devices, such as solid state, magnetic and/or optical drives, input devices, such as keyboard, mouse, touch sensitive screen, and so forth, and output devices, such as, display devices, printers, and so forth.

FW/BIOS 106 may be any one of a number FW/BIOS known in the art. Except for virtual machine application processor startup technology, OS 112 may likewise be any one of a number of OS known in the art, e.g., the Windows OS from Microsoft® Corporation. Applications 114 may likewise be any one of a number of applications known in the art.

Figure 2:
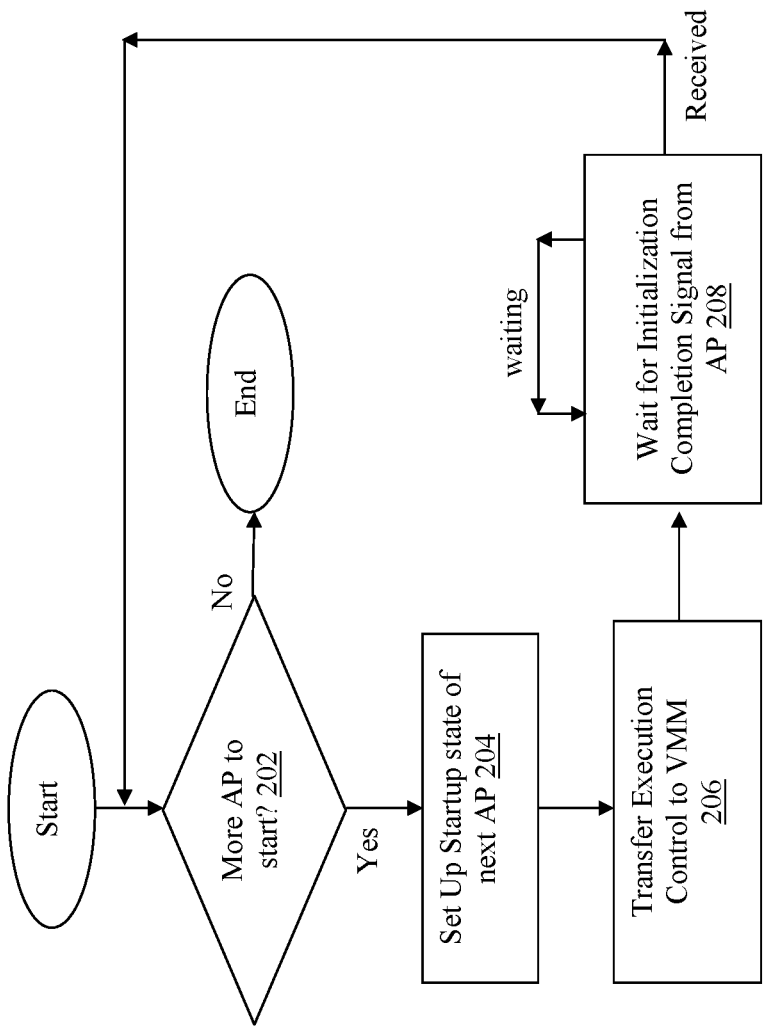
FIG. 2 illustrates an example process of the BSP startup module, according to various embodiments.

Referring now to FIG. 2, wherein an example process of the BSP module, according to various embodiments, is shown. As illustrated, process 200 may include the operations performed at blocks 202-208. The operations at blocks 202-208 may be performed e.g., by BSP module 132 of FIG. 1, operated by virtual BSP 111 mapped to a selected one of the processor cores of processor 102.

Process 200 may start at block 202. At block 202, a determination may be made on whether there are still more AP to be started for a VM being started. The determination may be performed e.g., by BSP module 132 on bootup by OS 112 at startup of VM 122.

If there are still more AP to be started, at block 204, the startup state of the next AP to be started may be set up. In embodiments, the startup state of the next AP to be started may be set up in a general purpose register of the BSP of the VM. The startup state may include various execution control values at startup, e.g., the next instruction pointer, stack pointer values, memory parameters, and so forth. In embodiments, e.g., in X86 execution environments, the startup state may include the value of the (extended) instruction pointer (IP or EIP) register, the values of the various segmentation registers (i.e., the global descriptor table (GDT), and the CS, DS, ES, FS registers), and so forth. In embodiments, the control register may be the model specific register (MSR) of the BSP of the VM.

Next, at block 206, on setting up of the startup state of the next AP to be started, execution control may be transferred to the VMM. The transfer of the execution control may explicitly or implicitly include the location of the data of the startup state. In embodiments, writing into the control register (e.g., the MSR) of the BSP may result in a trap from the control register to the VMM.

Next at block 208, process 200 may wait for a startup completion signal or message from the AP being started. Eventually, on receipt of the startup completion signal or message from the AP being started, process 200 may return to block 202, and continue therefrom, as earlier described.

Eventually, when all APs of the VM being started has been started, from block 202, process 200 may end (as opposed to proceed to block 204).

FIG. 3 illustrates an example process of the VMM, according to the various embodiments. As illustrated, process 300 may include the operations performed at blocks 302-306. The operations at blocks 302-306 may be performed e.g., by VMM 120 of FIG. 1, operated by one or more of the processor cores of processor 102.

Process 300 may start at block 302. At block 302, the startup state of the next AP to be started for a VM being started (as set up by the BSP module of the VM) may be retrieved. For example, on receipt of execution control (as trapped from the control register of the VM), VMM 120 may retrieve the startup state of the next AP to be started from the general purpose register of the corresponding BSP (where the trap came from).

Next, at block 304, the retrieved startup state of the next AP to be started may be programmed into a control structure of the VM, accessible to the AP to be started.

Next, at block 306, the AP may be started (e.g., by the VMM) to execute at the start state programmed into the control structure of the VM.

FIG. 4 illustrates an example process of the application processor startup module, according to various embodiments. As illustrated, process 400 may include the operations performed at blocks 402-406. The operations at blocks 402-406 may be performed e.g., by AP module 134 of FIG. 1, operated by one of the virtual APs 110 mapped to a selected one of the processor cores of processor 102.

Process 400 may start at block 402. At 402, execution of AP may start directly at a protected mode, without first going through a real mode of execution, at the start state as programmed in the control structure of the VM. In embodiments, the protected mode of execution may be started with memory paging.

At block 404, on retrieval of the start state as programmed in the control structure of the VM, the AP may be initialized.

At block 406, on completion of initialization, the BSP may be signaled to notify the BSP of initialization complete, or a completion message may be sent.

Accordingly, an improved approach to starting APs of a VM has been described. The advantage of the virtual machine AP startup technology of the present disclosure may include speeding up the virtual machine AP startup process, and/or reduces the complexity of the VMM, by not requiring the VMM to support real-mode execution during AP startup. The advantage may be significant, especially when a VM is configured with multiple APs to be started.

Figure 5:
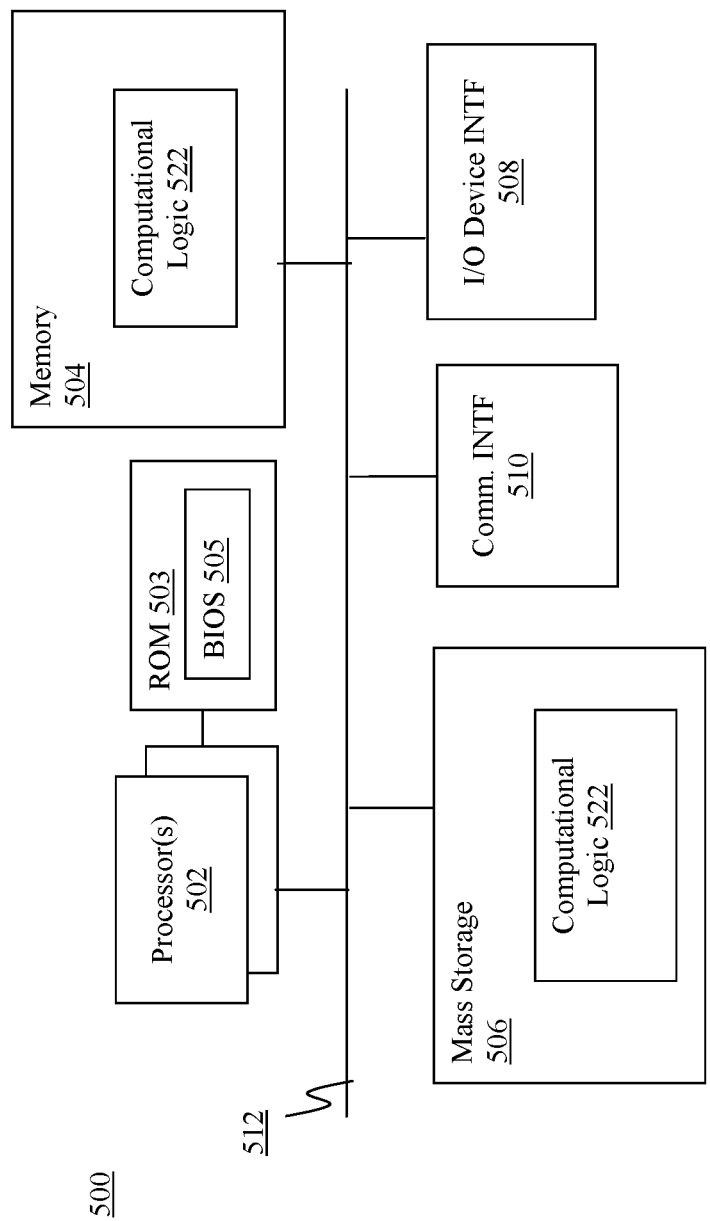
FIG. 5 illustrates an example computer system suitable for use to practice aspects of the present disclosure, according to various embodiments.

FIG. 5 illustrates an example computer system that may be suitable for use to practice selected aspects of the present disclosure. As shown, computer 500 may include one or more processors with multiple processor cores 502, read-only memory (ROM) 503, and system memory 504. Additionally, computer system 500 may include mass storage devices 506. Example of mass storage devices 506 may include, but are not limited to, tape drives, hard drives, compact disc read-only memory (CD-ROM) and so forth). Further, computer system 500 may include input/output devices 508 (such as display, keyboard, cursor control and so forth) and communication interfaces 510 (such as network interface cards, modems and so forth). The elements may be coupled to each other via system bus 512, which may represent one or more buses. In the case of multiple buses, they may be bridged by one or more bus bridges (not shown).

Each of these elements may perform its conventional functions known in the art. In particular, ROM 503 may include basic input/output system services (BIOS) 505. System memory 504 and mass storage devices 506 may be employed to store a working copy and a permanent copy of the programming instructions implementing the operations associated with BSP startup module 132, AP startup module 134, and/or VMM 120 as earlier described, collectively referred to as computational logic 522. The various elements may be implemented by assembler instructions supported by processor(s) 502 or high-level languages, such as, for example, C, that can be compiled into such instructions.

The number, capability and/or capacity of these elements 510-512 may vary, depending on whether computer system 500 is used as a mobile device, such as a wearable device, a smartphone, a computer tablet, a laptop and so forth, or a stationary device, such as a desktop computer, a server, a game console, a set-top box, an infotainment console, and so forth. Otherwise, the constitutions of elements 510-512 are known, and accordingly will not be further described.

Figure 6:
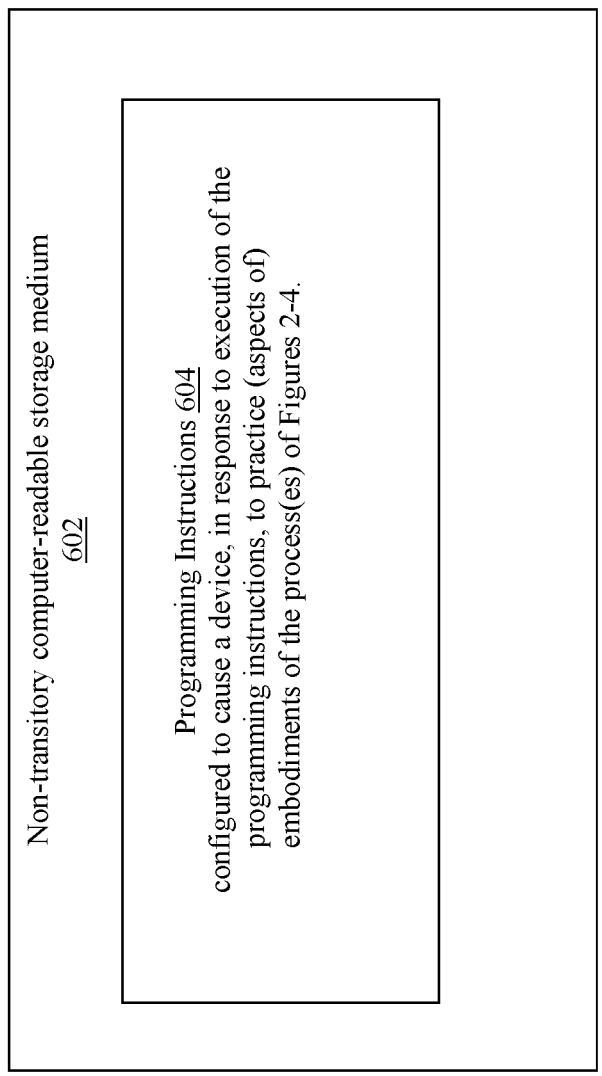
FIG. 6 illustrates a storage medium having instructions for practicing methods described with references to FIGS. 2-4, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) BSP startup module 132, AP startup module 134 and/or VMM 120. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 5, for one embodiment, at least one of processors 602 may be packaged together with memory having aspects of BSP startup module 132, AP startup module 134 and/or VMM 120. For one embodiment, at least one of processors 602 may be packaged together with memory having aspects of BSP startup module 132, AP startup module 134 and/or VMM 120, to form a System in Package (SiP). For one embodiment, at least one of processors 602 may be integrated on the same die with memory having aspects of BSP startup module 132, AP startup module 134 and/or VMM 120. For one embodiment, at least one of processors 602 may be packaged together with memory having aspects of BSP startup module 132, AP startup module 134 and/or VMM 120, to form a System on Chip (SoC). For at least one embodiment, the SoC may be utilized in, e.g., but not limited to, a wearable device, a smartphone or a computing tablet.

Thus various example embodiments of the present disclosure have been described including, but are not limited to:

Example 1 may be an apparatus for computing, comprising: a plurality of processor cores; and a plurality of operating system modules of an operating system, including: a bootstrap processor startup module to be operated by a first of the plurality of processor cores selected to be a bootstrap processor of a virtual machine while the virtual machine is being started up, to write into a storage area a start state of an application processor of the virtual machine; and an application processor startup module to be operated by a second of the plurality of processor cores selected to be the application processor, to start the application processor at the start state, directly in a protected mode of execution without first going through a real mode of execution.

Example 2 may be example 1, wherein the bootstrap processor startup module, on writing the start state of the application processor into the storage area, may further transfer execution control to a virtual machine manager of the apparatus.

Example 3 may be example 2, wherein the transfer of execution control may include explicit or implicit provision of the location of the storage area to the virtual machine manager.

Example 4 may be example 2, wherein the storage area may be a control register of the bootstrap processor, and the execution control may be transferred to the virtual machine manager via a trap from the control register.

Example 5 may be any one of examples 2-4, further comprising the virtual machine manager, wherein the virtual machine manager may be operated by the one or more processor cores to retrieve the start state of the application from the storage area, program the start state of the application processor into a control structure of the virtual machine accessible to the application processor, and set the application processor to start execution at the start state programmed in the control structure, on receipt of the execution control.

Example 6 may be example 5, wherein the application processor startup module may further start the application processor directly in the protected mode of execution with memory paging.

Example 7 may be example 5, wherein the application processor startup module may further initialize the application processor, and signal the boostrap processor startup module on completion of the initialization.

Example 8 may be example 7, wherein the bootstrap processor startup module may further await for the completion signal prior to perform another write into the storage area of another start state of another application processor of the virtual machine.

Example 9 may be a method for computing, comprising: writing into a storage area of an apparatus, by a bootstrap processor startup module operated by a first of a plurality of processor cores of the apparatus selected to be a bootstrap processor of a virtual machine, a start state of an application processor of the virtual machine, while the virtual machine may be being started up; and starting, by an application processor startup module to be operated by a second of the plurality of processor cores selected to be the application processor, the application processor at the start state, directly in a protected mode of execution without first going through a real mode of execution.

Example 10 may be example 9, further comprising transferring execution control, by the bootstrap processor startup module, to a virtual machine manager of the apparatus, on writing the start state of the application processor into the storage area.

Example 11 may be example 10, wherein transferring execution control may include explicitly or implicitly providing the location of the storage area to the virtual machine manager.

Example 12 may be example 10, wherein the storage area may be a control register of the bootstrap processor, and transferring of the execution control comprises trapping to the virtual machine manager from the control register.

Example 13 may be any one of examples 10-12, further comprising retrieving, by the virtual machine manager, the start state of the application from the storage area, programming the start state of the application processor into a control structure of the virtual machine accessible to the application processor, and setting the application processor to start execution at the start state programmed in the control structure, on receipt of the execution control.

Example 14 may be example 13, further comprising starting, by the application processor startup module, the application processor directly in the protected mode of execution with memory paging.

Example 15 may be example 13, further comprising initializing, by the application processor startup module, the application processor, and signaling the boostrap processor startup module on completion of the initialization.

Example 16 may be example 15, further comprising awaiting, by the bootstrap processor startup module, the completion signal prior to perform another write into the storage area of another start state of another application processor of the virtual machine.

Example 17 may be one or more computer-readable media comprising instructions that cause a computing device, in response to execution of the instructions by a plurality of processor cores of the computing device, to provide: a bootstrap processor startup module to be operated by a first of the plurality of processor cores selected to be a bootstrap processor of a virtual machine while the virtual machine may be being started up, to write into a storage area of the computing device a start state of an application processor of the virtual machine; and an application processor startup module to be operated by a second of the plurality of processor cores selected to be the application processor, to start the application processor at the start state, directly in a protected mode of execution without first going through a real mode of execution.

Example 18 may be example 17, wherein the bootstrap processor startup module, on writing the start state of the application processor into the storage area, may further transfer execution control to a virtual machine manager of the apparatus.

Example 19 may be example 18, wherein the transfer of execution control may include explicit or implicit provision of the location of the storage area to the virtual machine manager.

Example 20 may be example 18, wherein the storage area may be a control register of the bootstrap processor, and the execution control may be transferred to the virtual machine manager via a trap from the control register.

Example 21 may be any one of examples 18-20, further comprising the virtual machine manager, wherein the virtual machine manager may be operated by the one or more processor cores to retrieve the start state of the application from the storage area, program the start state of the application processor into a control structure of the virtual machine accessible to the application processor, and set the application processor to start execution at the start state programmed in the control structure, on receipt of the execution control.

Example 22 may be example 21, wherein the application processor startup module may further start the application processor directly in the protected mode of execution with memory paging.

Example 23 may be example 21, wherein the application processor startup module may further initialize the application processor, and signal the boostrap processor startup module on completion of the initialization.

Example 24 may be example 23, wherein the bootstrap processor startup module may further await for the completion signal prior to perform another write into the storage area of another start state of another application processor of the virtual machine.

Example 25 may be an apparatus for computing, comprising: bootstrap processor means for writing into a storage area of a bootstrap processor of a virtual machine of the apparatus, a start state of an application processor of the virtual machine, while the virtual machine may be being started up; and application processor means for starting the application processor at the start state, directly in a protected mode of execution without first going through a real mode of execution.

Example 26 may be example 25, wherein the bootstrap processor means may comprise means for transferring execution control to a virtual machine manager of the apparatus, on writing the start state of the application processor into the storage area.

Example 27 may be example 26, wherein transferring execution control may include explicitly or implicitly providing the location of the storage area to the virtual machine manager.

Example 28 may be example 26, wherein the storage area may be a control register of the bootstrap processor, and transferring of the execution control comprises trapping to the virtual machine manager from the control register.

Example 29 may be example 26-28, wherein the virtual machine manager may comprise means for retrieving the start state of the application from the storage area, means for programming the start state of the application processor into a control structure of the virtual machine accessible to the application processor, and means for setting the application processor to start execution at the start state programmed in the control structure, on receipt of the execution control.

Example 30 may be example 29, wherein the application processor means comprises means for starting the application processor directly in the protected mode of execution with memory paging.

Example 31 may be example 29, the application processor means may comprise means for initializing the application processor, and means for signaling the boostrap processor startup module on completion of the initialization.

Example 32 may be example 31, wherein the bootstrap processor means may comprise means for awaiting the completion signal prior to perform another write into the storage area of another start state of another application processor of the virtual machine.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for computing, comprising:
a plurality of processor cores; and
a plurality of operating system modules of an operating system, including:
a bootstrap processor startup module to be operated by a first of the plurality of processor cores selected to be a bootstrap processor of a virtual machine while the virtual machine is being started up, to write into a storage area a start state of an application processor of the virtual machine; and
an application processor startup module to be operated by a second of the plurality of processor cores selected to be the application processor, to start the application processor at the start state, directly in a protected mode of execution without first going through a real mode of execution.

2. The apparatus of claim 1, wherein the bootstrap processor startup module, on writing the start state of the application processor into the storage area, is to further transfer execution control to a virtual machine manager of the apparatus.

3. The apparatus of claim 2, wherein the transfer of execution control includes explicit or implicit provision of a location of the storage area to the virtual machine manager.

4. The apparatus of claim 2, wherein the storage area is a control register of the bootstrap processor, and the execution control is transferred to the virtual machine manager via a trap from the control register.

5. The apparatus of claim 2, further comprising the virtual machine manager, wherein the virtual machine manager is to be operated by the plurality of processor cores to retrieve the start state of the application processor from the storage area, program the start state of the application processor into a control structure of the virtual machine accessible to the application processor, and set the application processor to start execution at the start state programmed in the control structure, on receipt of the execution control.

6. The apparatus of claim 5, wherein the application processor startup module is to further start the application processor directly in the protected mode of execution with memory paging.

7. The apparatus of claim 5, wherein the application processor startup module is to further initialize the application processor, and signal the boostrap processor startup module on completion of the initialization.

8. The apparatus of claim 7, wherein the bootstrap processor startup module is to further await for the completion signal prior to performing another write into the storage area of another start state of another application processor of the virtual machine.

9. A method for computing, comprising:
writing into a storage area of an apparatus, by a bootstrap processor startup module operated by a first of a plurality of processor cores of the apparatus selected to be a bootstrap processor of a virtual machine, a start state of an application processor of the virtual machine, while the virtual machine is being started up; and
starting, by an application processor startup module to be operated by a second of the plurality of processor cores selected to be the application processor, the application processor at the start state, directly in a protected mode of execution without first going through a real mode of execution.

10. The method of claim 9, further comprising transferring execution control, by the bootstrap processor startup module, to a virtual machine manager of the apparatus, on writing the start state of the application processor into the storage area.

11. The method of claim 10, wherein transferring execution control includes explicitly or implicitly providing a location of the storage area to the virtual machine manager.

12. The method of claim 10, wherein the storage area is a control register of the bootstrap processor, and transferring of the execution control comprises trapping to the virtual machine manager from the control register.

13. The method of claim 10, further comprising retrieving, by the virtual machine manager, the start state of the application processor from the storage area, programming the start state of the application processor into a control structure of the virtual machine accessible to the application processor, and setting the application processor to start execution at the start state programmed in the control structure, on receipt of the execution control.

14. The method of claim 13, further comprising starting, by the application processor startup module, the application processor directly in the protected mode of execution with memory paging.

15. The method of claim 13, further comprising initializing, by the application processor startup module, the application processor, and signaling the boostrap processor startup module on completion of the initialization.

16. The method of claim 15, further comprising awaiting, by the bootstrap processor startup module, the completion signal prior to performing another write into the storage area of another start state of another application processor of the virtual machine.

17. One or more non-transitory computer-readable media comprising instructions that cause a computing device, in response to execution of the instructions by a plurality of processor cores of the computing device, to provide:
a bootstrap processor startup module to be operated by a first of the plurality of processor cores selected to be a bootstrap processor of a virtual machine while the virtual machine is being started up, to write into a storage area of the computing device a start state of an application processor of the virtual machine; and
an application processor startup module to be operated by a second of the plurality of processor cores selected to be the application processor, to start the application processor at the start state, directly in a protected mode of execution without first going through a real mode of execution.

18. The non-transitory computer-readable media of claim 17, wherein the bootstrap processor startup module, on writing the start state of the application processor into the storage area, is to further transfer execution control to a virtual machine manager of an apparatus.

19. The non-transitory computer-readable media of claim 18, wherein the transfer of execution control includes explicit or implicit provision of a location of the storage area to the virtual machine manager.

20. The non-transitory computer-readable media of claim 18, wherein the storage area is a control register of the bootstrap processor, and the execution control is transferred to the virtual machine manager via a trap from the control register.

21. The non-transitory computer-readable media of claim 18, further comprising the virtual machine manager, wherein the virtual machine manager is to be operated by plurality of processor cores to retrieve the start state of the application processor from the storage area, program the start state of the application processor into a control structure of the virtual machine accessible to the application processor, and set the application processor to start execution at the start state programmed in the control structure, on receipt of the execution control.

22. The non-transitory computer-readable media of claim 21, wherein the application processor startup module is to further start the application processor directly in the protected mode of execution with memory paging.

23. The non-transitory computer-readable media of claim 21, wherein the application processor startup module is to further initialize the application processor, and signal the boostrap processor startup module on completion of the initialization.

24. The non-transitory computer-readable media of claim 23, wherein the bootstrap processor startup module is to further await for the completion signal prior to performing another write into the storage area of another start state of another application processor of the virtual machine.

* * * * *